United States Patent [19]

Ludwig

[11] 4,298,266
[45] Nov. 3, 1981

[54] INTERCHANGEABLE LENS FOR CAMERAS, SUCH AS REFLEX CAMERAS

[76] Inventor: Christian Ludwig, Dreissentalstr. 54, 7082 Oberkochen, Fed. Rep. of Germany

[21] Appl. No.: 194,640

[22] Filed: Oct. 6, 1980

[30] Foreign Application Priority Data

Oct. 13, 1979 [DE] Fed. Rep. of Germany ....... 2941601

[51] Int. Cl.$^3$ .......................... G03B 17/00; G03B 9/00
[52] U.S. Cl. ..................................... 354/286; 354/232
[58] Field of Search ................ 350/255, 257; 354/286, 354/228, 230, 232, 195, 196, 270–274

[56] References Cited

U.S. PATENT DOCUMENTS

| | | | |
|---|---|---|---|
| 3,046,862 | 7/1962 | Müller ................................. | 354/195 |
| 3,165,997 | 1/1965 | Sugano et al. ...................... | 354/232 |
| 3,858,225 | 12/1974 | Hasegawa et al. ............. | 354/286 X |

*Primary Examiner*—Donald A. Griffin
*Attorney, Agent, or Firm*—Arthur A. March

[57] ABSTRACT

Interchangeable lens assembly having a composite two part telescoping force transmission shaft, which functions as a cocking and releasing member, which has one end engageable with the cocking member of the shutter system and the other end engageable with a camera-side drive shaft when the lens assembly is attached to the camera, and which serves for the transmission of torques, i.e. alternately both from the camera to the lens assembly and from the lens assembly to the camera, wherein, in order to limit the torque loads in the two parts of such force transmission shaft to the function related movement cycles, and correspondingly to assure that the two shaft parts are relatively displaceable without appreciable sliding resistances therebetween as the lens is being focused, the shaft part associated with the shutter system is provided with two sub-parts, forming coupling members, and to one coupling sub-part which is in engagement with the cocking member of the shutter system a bolt is associated which at the end of the cocking movement drops into such coupling sub-part to lock the same and which can be moved positively out of its locking position thereat by the other coupling sub-part in an initial movement phase initiated by the camera release operation.

7 Claims, 9 Drawing Figures

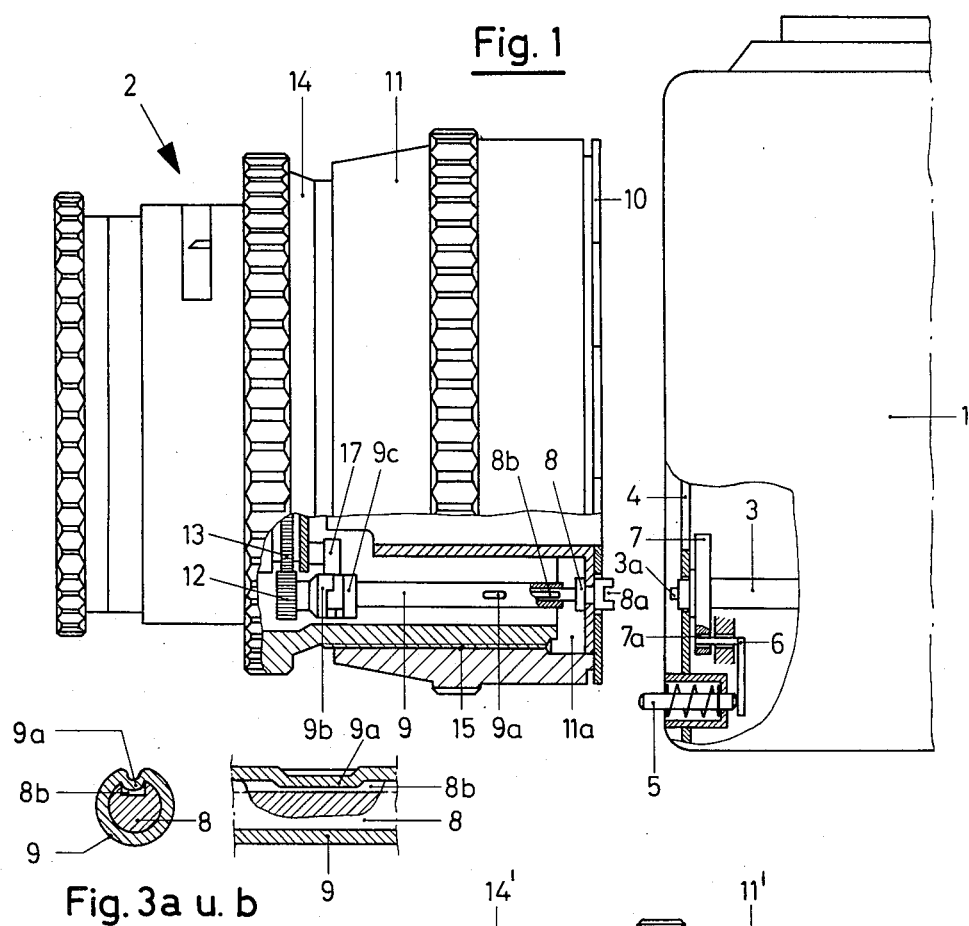
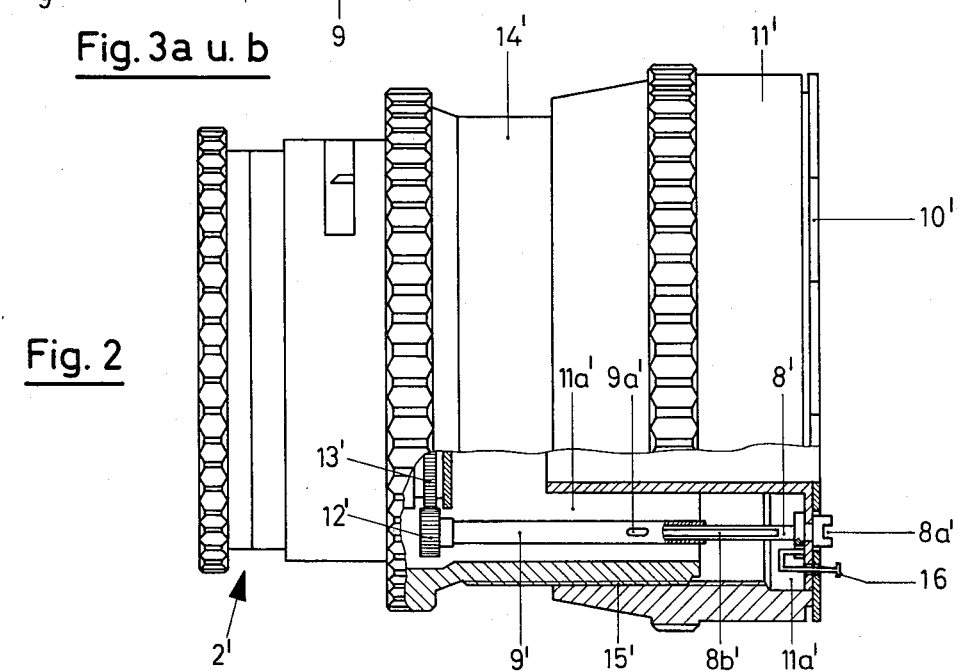

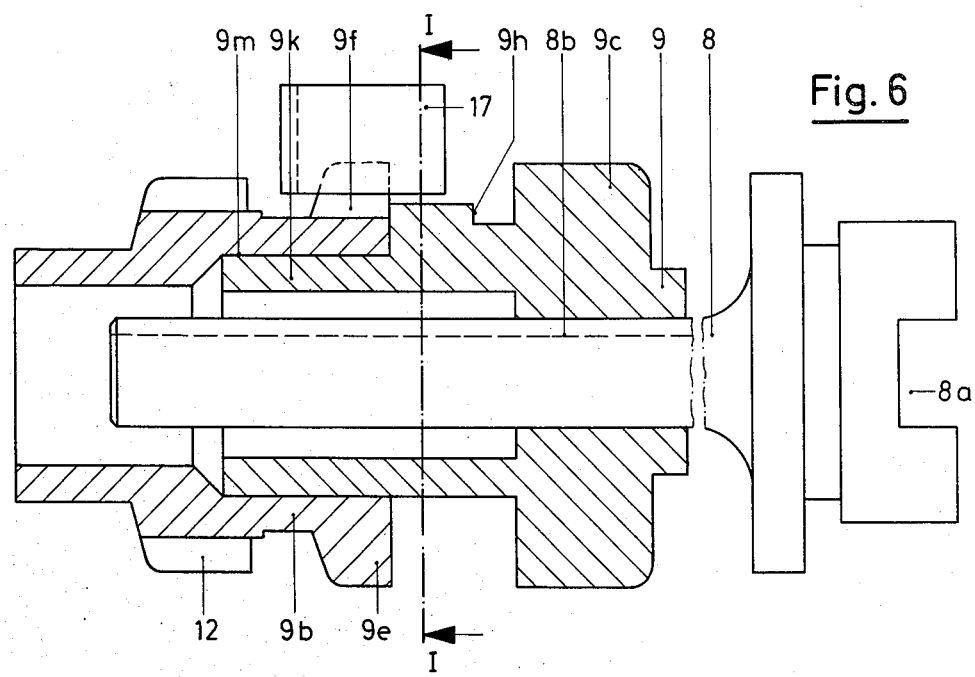
Fig. 6
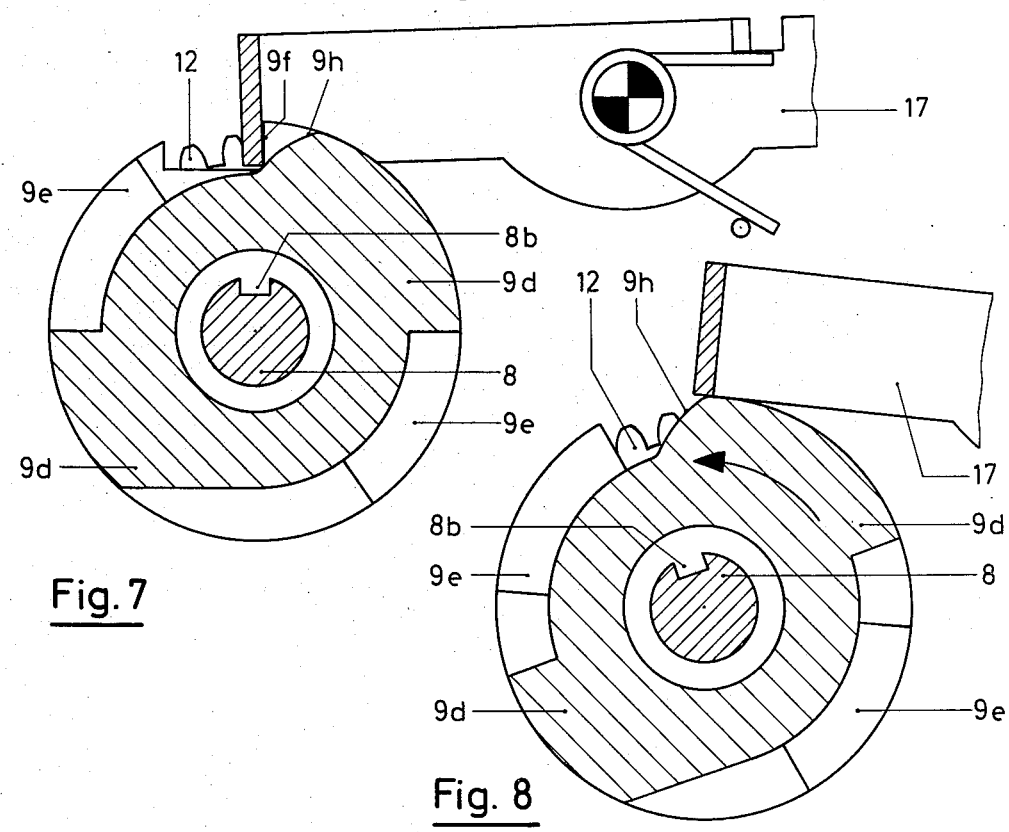
Fig. 7
Fig. 8

INTERCHANGEABLE LENS FOR CAMERAS, SUCH AS REFLEX CAMERAS

The present invention relates to an interchangeable lens apparatus for cameras, in particular reflex cameras, and more particularly to a lens assembly having a shutter arranged axially movably relative to the camera housing and adapted to accommodate a spring as force accumulator for the shutter sector drive, and also having a composite two part telescoping force transmission shaft executing the function of a cocking and release member and whose one end is drivably connected with a cocking member for the shutter sector drive and whose other end, upon attachment or removal of the interchangeable lens, can be brought into and out of positive engagement with a main drive shaft disposed on the camera side, i.e. adjacent side of the camera housing, and which is rotationally connected with the cocking button of the camera.

Known lenses of the above described general kind interchangeably attachable onto a camera can be screwed onto the camera only under the condition that the key face of the camera-side main drive shaft and that of the lens-side telescoping force transmission shaft occupy a position adapted for coupling tangentially to the usual annular bayonet mounting plate. The setting of the two positively connectable key faces is achieved, in the usual handling of the camera and with the lens screwed on, when the camera-side cocking button has been actuated and the lens-side shutter has been brought into the cocked state via the camera main drive shaft.

While the camera-side main drive shaft is prevented by a bolt operable from the camera release system from moving back to release position, the locking of the telescoping force transmission shaft is effected by a locking bolt acting on its connectable shaft portion, which locking bolt is automatically brought into and out of engagement as the lens is being screwed on or off, respectively. Due to this conventional locking mode, the lens-side telescoping or force transmission shaft is always under the full torsional tension originating from the drive spring of the lens shutter, and this is so regardless of whether the lens is placed on the camera or is detached from it.

When under these physical conditions a focusing adjustment is carried out on the known type of interchangeable lens, the shaft portions of the force transmission shaft also undergo an axial displacement due to the relative displacement of the housing parts. Under the action of the torque load on the force transmission shaft, however, this axial displacement can in each case occur only against the sliding frictional resistance resulting from such torsional stress, the resistance to be overcome being ultimately dependent on the length of the force transmission shaft, which in turn depends on the focal length of the lens. The greater the focal length of the lens, the longer will be the interengaging shaft train of the telescoping shaft, and the greater the resistance to be overcome in the focusing adjustment at the lens.

To this must be added the fact that in these known arrangements, the sliding frictional resistance due to the eccentric position of the telescoping shaft away from the lens axis is such that during the adjusting process an additional tilting moment is produced. As a result, it has heretofore been possible, with interchangeable lenses of the known kind, to obtain a smooth adjusting movement only at relatively great expense of time and cost for providing desired adjustment and selection capabilities.

It is among the objects and advantages of the present invention to overcome the above described drawbacks and disadvantages of known interchangeable lens, and to provide an interchangeable lens assembly at relatively low constructional cost and of improved design, particularly in the sense that the telescoping force transmission shaft is relieved of torsional loads, and of all the functional and cost disadvantages thereof, so that the focusing of the lens can be carried out smoothly and reliably.

Other and further objects and advantages of the present invention will become apparent from a study of the within specification and accompanying drawings, in which:

FIG. 1 shows a schematic view of an interchangeable lens according to an embodiment of the present invention which is attachable onto a camera;

FIG. 2 shows a schematic view of a PRIOR ART interchangeable lens having a force transmission shaft of the conventional type;

FIGS. 3a and 3b show schematic views respectively of a transverse section and a longitudinal section through the shaft parts of the telescoping force transmission shaft of the arrangement according to the invention;

FIG. 6 shows schematically a longitudinal section through the coupling sub-parts of FIGS. 4 and 5;

FIG. 7 shows schematically a transverse section through the coupling sub-parts along the line I—I of FIG. 6, the coupling sub-part which holds the shutter in the cocked state being illustrated as locked by a bolt; and FIG. 8 shows schematically the same arrangement as in FIG. 7, but after unlocking of the coupling sub-part which holds the shutter in the cocked state.

Figure 4:
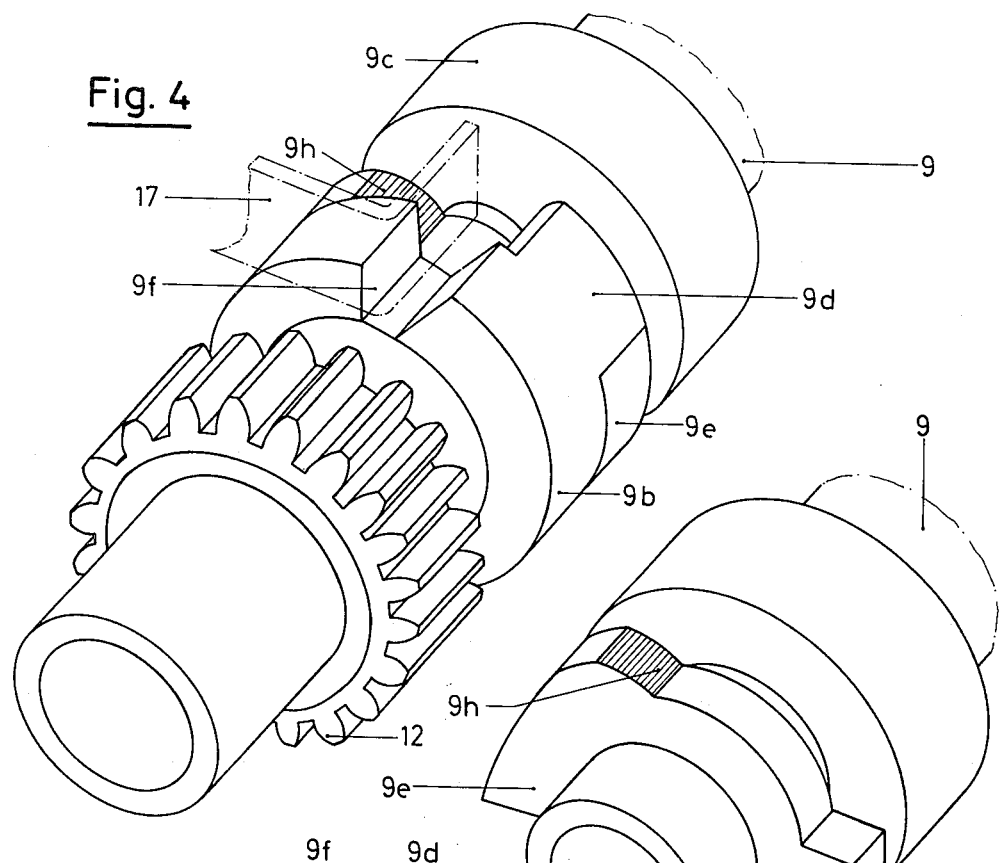
FIG. 4 shows schematically in perspective two positively connected coupling sub-parts of the arrangement according to the invention.

In accordance with the present invention, an interchangeable lens is provided in which the one shaft part of the two part telescoping force transmission shaft associated with the shutter is composed of two mutually rotatable sub-parts which are designed as coupling members. These coupling sub-parts are correlated force-lockingly in such a way that in the shutter cocking direction of rotation of the one shaft sub-part such one sub-part takes along the other shaft sub-part, which can be locked at the end of the cocking movement by the dropping thereinto of a bolt, while in the opposite or shutter releasing direction of rotation the sub-part not locked brings the bolt in the locked sub-part out of engagement therewith in an initial movement phase, whereupon this sub-part, having been released, takes along the other non-lockable sub-part.

Due to the complete liberation of the composite telescoping shaft from torque loads during the adjusting process, by the fact that the driving force introduced in the shutter via this shaft and stored therein is now absorbed by a lockable sub-part which no longer participates in the sliding friction during a relative displacement of the shaft parts, it is now possible in interchangeable lenses with built-in shutter to eliminate in a simple manner and at relatively little expense the difficulties which heretofore were an obstacle to smooth focusing of the lens.

As particularly advantageous, moreover, must be regarded those effects which result, with respect to manufacture, from the avoidance of torsional load on the telescoping shaft, due to the fact that in the mounting of lenses the previously inevitable and time-consuming search, accompanied by repeated exchange of shaft parts for such shaft parts as are suitable for pairing, i.e. for assembly with guarantee of slidability even under torsional load, had been obviated. As this criterion no longer exists, any available shaft part can be combined with any desired other shaft part, whereby, for one thing, manufacture is simplified and, for another, assurance is given that all available parts can be utilized for the mounting, including those parts the utilization of which had to be given up heretofore only because the requirements of slidability of the telescoping shaft could not be maintained after the assembly of the shaft parts despite given dimensional stability.

In an advantageous preferred development of the invention, a simple and low-cost design is achieved, and reliable operation is insured by designing the two coupling members or sub-parts as cylindrical bodies and providing them with projections at their end faces turned toward each other, and by further providing the coupling sub-part associated with the shutter with a locking edge and the other coupling sub-part, which during its initial rotary movement phase lifts the bolt out of the locking position, with a lifting or displacement cam.

According to a further preferred feature of the present invention, coaxial guidance of the two coupling members is provided by forming a cylindrical shoulder on one part and a bore receiving such shoulder on the other part.

Referring to the drawing, 1 is the housing of a camera, e.g. a reflex camera, and 2 is an interchangeable lens apparatus according to an embodiment of the invention with built-in intermediate lens shutter (not shown) which can be screwed or attached onto the camera housing 1 by means of the usual bayonet lock. The camera, illustrated only in part in the drawing, is of the type in which for actuation of the reflex mirror mechanism and the like, a spring-driven main drive shaft 3 is provided, which by one end is passed through the camera-side bayonet mounting plate 4 and is provided on its front face with a coupling tooth 3a.

The drive shaft 3 can be brought into cocked position by means of a manual cocking button (not shown), can be held in cocked position, and can be released from this cocked position by a locking mechanism operated by a release button 5 and consisting for example of a pin 6 and a disc 7 non-rotationally connected with shaft 3. The correlation of parts 6 and 7 of the locking mechanism is such that the spring-loaded pin 6 drops into a recess 7a on the periphery of disc 7 as soon as shaft 3 has reached the cocked position. In this position, the coupling tooth 3a occupies a position tangential to the ring type bayonet mounting plate 4.

When screwing or attaching the interchangeable lens apparatus 2 to the camera housing 1, a composite two part telescoping force transmission shaft 8, 9 can be brought into active connection with the drive shaft 3. For this purpose, a coupling slot 8a is machined in the front face of said transmission shaft at its end protruding from the lens-side bayonet mounting plate 10. This slot 8a, just as the coupling tooth 3a, must occupy a tangentially directed adjusting position when the interchangeable lens apparatus 2 is screwed on, and this is always the case when the shutter of the lens has first been brought into the cocked state before removal of the interchangeable unit or assembly via the telescoping force transmission shaft functioning as a cocking and release shaft.

This is true both of conventional telescoping shafts of interchangeable lenses as presently used and one of which is illustrated as PRIOR ART in FIG. 2, and of interchangeable lenses designed according to the present invention as shown in FIG. 1. As the two interchangeable units may be regarded as completely identical, except of course for the arrangement of the telescoping force transmission shafts, their parts have been given the same reference numerals, although those of the conventional form per FIG. 2 are additionally marked with a prime (').

In the normal conception of an interchangeable lens 2, 2', i.e. according to the present invention and the PRIOR ART, respectively (FIGS. 1 and 2), the composite two part telescoping shaft 8, 9 or 8', 9' is disposed in an annular space 11a, 11a' of the housing part 11, 11' provided with a bayonet mounting plate 10, 10' and extends axis-parallel to the lens axis. Besides, the composite shaft is brought into engagement by means of a pinion 12, 12' with the cocking member 13, 13' of a central shutter (not shown) installed in a barrel 14, 14'. The barrel 14, 14' in turn is adapted for rotation relative to the housing 11, 11' for the purpose of distance adjustment or focusing and for axial displacement, by means of a setting screw-thread 15, 15' indicated only symbolically in the drawing.

The arrangement of the shutter in the barrel type housing part 14, 14' is such that in known manner the shutter participates in an axial displacement, but not in a rotational movement of these parts, when the barrel is manually adjusted to a certain distance value for the purpose of focusing.

For the cocking and releasing of the shutter there is used, as has been explained above, the composite two part telescoping shaft 8, 9, 8', 9' which can be brought into non-rotational connection with the drive shaft 3 when screwing the interchangeable lens 2, 2' onto the camera housing 1. One of these two shaft parts, namely part 8, 8', is provided, as can be seen in particular from representative FIG. 3a and 3b, with a longitudinal groove 8b, 8b', and the other of these shaft parts, namely part 9, 9' is provided with a bead 9a, 9a' engaging in this longitudinal groove.

When lens 2, 2' is attached onto the camera housing 1, the key faces 3a and 8a, 8a' of the camera-side drive shaft 3 and of the lens-side composite force transmission shaft come into positive ("form-locking") engagement. As a result, upon rotation of drive shaft 3 as well as upon rotation of the telescoping force transmission shaft 8, 9, 8', 9', the corresponding other shaft participates in the rotational movement. When the camera is cocked by actuating the cocking button provided thereon, both the spring (not shown) engaging at the drive shaft 3, and the spring (not shown) of the lens-side shutter are tensioned via the two part force transmission shaft 8, 9, 8', 9'.

At the end of this tensioning process, drive shaft 3 is prevented from moving back or in reverse direction by the locking mechanism 6, 7, and so is the lens-side telescoping shaft by the positive engagement of the key face 3a. This locking action must be maintained even when the lens is taken off the camera, to which end, on the PRIOR ART lenses per FIG. 2 used until now, a bolt 16 is provided which, automatically becoming operative upon removal of the lens, acts on the shaft part or portion 8' of the telescoping shaft 8', 9'.

On the other hand, this locking system is constituted so that with the screwing of the lens and with the concomitant positive engagement of the key surface 3a and 8a', it is necessarily moved out of the locking position while the telescoping shaft 8', 9' is prevented from a rotational movement by the positive lock ("form closure") with the locked driving shaft 3.

If then the release button 5 is actuated, the locking mechanism 6, 7 releases the drive shaft 3 for the execution of a rotational movement or respectively for the release of the lens-side shutter.

This known method of locking the lens-side telescoping shaft 8', 9' has proved in practice to be extremely disadvantageous and to involve problems inasmuch as, in the cocked state of the shutter, which, as explained above, is a prerequisite for carrying out a lens change, the full torsional stress of the shutter driving spring (not shown) rests on the telescoping shaft 8', 9'. This in turn means that in the shaft parts or portions 8', 9' of the telescoping shaft, upon relative displacement, friction resistances must be overcome which in the conventional interchangeable lenses are found to be disadvantageous especially due to irregular motion of the focusing member.

Figure 5:
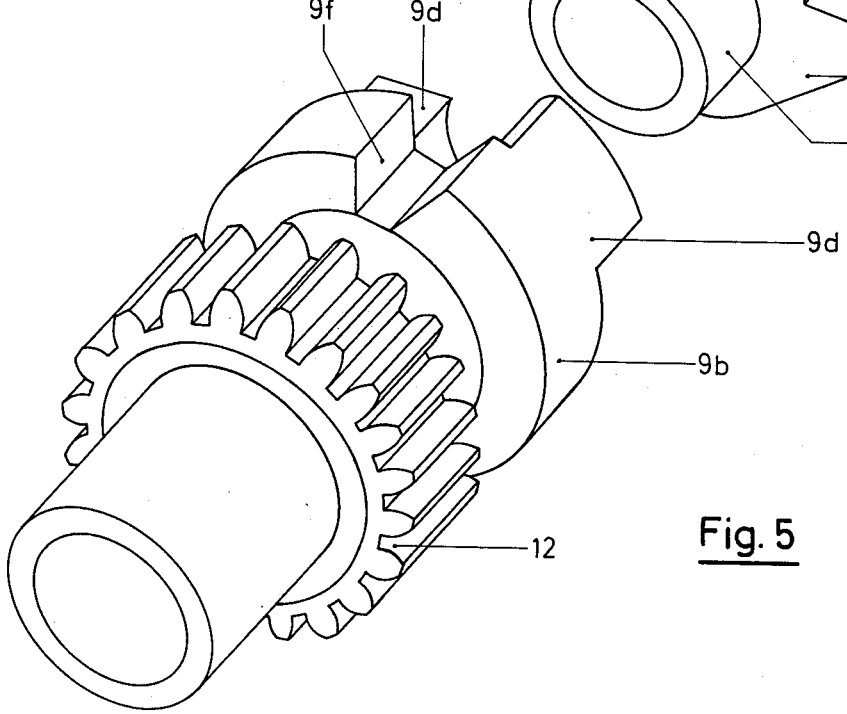
FIG. 5 shows schematically the two coupling sub-parts of FIG. 4 separated from each other.

To avoid this shortcoming with all its further disadvantageous effects, such as excessive wear, time-consuming checking of the slidability of shaft parts during mounting, removal of lenses for the changing of shaft parts for others, etc., the arrangement according to the present invention of an interchangeable lens according to FIG. 1 is advantageously provided. One of the features essential to the present invention is based on the fact that one shaft part or portion 9 of the composite telescoping force transmission shaft 8, 9, which introduces the cocking and releasing force into the shutter, has been divided as shown in FIGS. 4–8 into two mutually rotatable coupling sub-parts 9b and 9c which can be connected together for transmission of force ("force-lockingly").

Preferably, a pinion 12 is formed on sub-part 9b, while sub-part 9b is non-rotationally connected with sub-part 9c and the actual shaft part or portion 9, i.e. is rotatable limitedly relative thereto; the latter in turn, by engagement of a bead 9a in a longitudinal groove 8b, is rotationally connected with the shaft part or portion 8, i.e. rotates together therewith. On the mutually facing end faces of the preferably cylindrical coupling sub-parts 9b and 9c, corresponding coacting projections or drivers 9d, 9e are formed, which appropriately are shaped and dimensioned so that one sub-part can execute a rotational movement relative to the other over a certain angle, without causing the other sub-part to participate in this rotational movement.

On the other hand, the projections or drivers 9d, 9e are correlated in such a way that upon actuation of the camera-side cocking button 5, the torque conveyed to the force transmission shaft 8, 9 via the drive shaft 3 is transmitted to the lens-side shutter by force-locking contact of driver 9e with driver 9d and further via the pinion 12 and cocking member 13. At the end of this cocking movement, sub-part 9b is locked, for which purpose there is formed on it a locking edge 9f and a bolt 17 is associated therewith.

With the dropping in of bolt 17 at sub-part 9b, at the end of the cocking process, the drive force originating from the spring drive of the shutter is intercepted at a sub-part which upon relative axial displacement of the telescoping shaft is not exposed to sliding friction forces.

When in a camera with screwed-on interchangeable lens per FIG. 1 the camera release 5 is actuated, this causes at first a release of the camera-side drive shaft 3, which under the action of a spring acting on it executes a rotational movement. Due to the form-locking connection 3a, 8a of the driving shaft 3 with the force transmitting shaft 8, 9, the latter is caused to participate in this rotational movement. As a result, a bevel 9h formed on sub-part 9c, as illustrated in FIG. 8, becoming operative, moves bolt 17 out of the locking position previously occupied by it. When the previously locked coupling sub-part 9b is free, it will, driven by the shutter spring (not shown), execute a rotary movement while simultaneously taking along the coupling sub-part 9c, with the sectors (not shown) of the shutter moving into open and again into closed position.

If after the shutter cycle, the camera-side cocking button is actuated again, the torque originating from it is again transmitted to the force transmission shaft 8, 9 via the drive shaft 3, coupling sub-part 9c taking along coupling sub-part 9b and in so doing conveying the cocking force to the lens shutter via pinion 12 and cocking member 13. By engagement of bolt 17 on the locking edge 9f of the sub-part 9b, on the one hand the shutter drive is blocked and on the other hand the shaft part or portion 9 of the telescoping shaft in non-rotational connection with the coupling sub-part 9c is absolutely relieved of torsional stress.

For the purpose of coaxial guiding of one coupling sub-part 9b relative to the other coupling sub-part 9c, there is formed on one of them a cylindrical guide pin 9k and on the other an axial bore 9m serving to receive this guide pin, as can be seen in particular from FIG. 6.

In the above described embodiment, the telescoping shaft designed according to the present invention serves to transmit cocking and releasing forces to a lens shutter. However, its scope of use is not limited to this. It may also be used in particular in an interchangeable lens equipped, not with a lens shutter but with a diaphragm, preferably a spring driven diaphragm, for the transmission of forces. This readily follows from the fact that in the above described embodiment, the present invention is explained with reference to an interchangeable lens with intermediate lens shutter and spring diaphragm, the drive springs of which are tensioned through the telescoping shaft.

Advantageously, in accordance with the foregoing, the present invention provides an interchangeable lens apparatus for attachment to cameras comprising a significant combination of associated elements.

These generally include a lens assembly having a movable portion arranged thereon for axial movement relative thereto and to the camera and adapted for accommodating a spring driven drive, cocking means arranged in the movable portion and adapted for cocking the spring driven drive, a composite two part telescoping force transmission shaft operatively arranged for forward and reverse rotational movement as a cocking and release control means for the cocking means and including a cocking means associated first part and a camera drive associated second part, the first part being arranged for axial telescoping movement relative to the second part, one telescoping shaft end comprising the end of the first part telescopingly remote from the second part and being drivably connected to the cocking means for cocking the spring driven drive, and the opposite telescoping shaft end comprising the end of the second part telescopingly remote from the first part and being adapted, upon attachment of the lens assembly to the camera, for positive operative driving rotational engagement with a drive shaft disposed in the adjacent portion of the camera, and releasable lock bolt means operatively arranged for releasably locking the telescoping shaft.

The first part of the telescoping shaft comprises two mutually rotatable sub-parts including a lockable release sub-part and a cocking sub-part operatively arranged as coupling members for forward rotation in a cocking direction and for reverse rotation in a releasing direction. The cocking sub-part is arranged for operatively engaging the release sub-part in the forward cocking direction of rotation of the cocking sub-part to rotate the release sub-part therewith during the cocking movement of the telescoping shaft, and the lock bolt means is operatively arranged for releasably locking the release sub-part at the end of such cocking movement. The cocking sub-part is further arranged for operatively releasing the lock bolt means from the release sub-part in the initial movement phase of the reverse releasing direction of rotation of the cocking sub-part, and the release sub-part is arranged for operatively engaging the cocking sub-part to rotate the cocking sub-part therewith during the remaining movement phase of the sub-parts in the reverse releasing direction of rotation.

More specifically, the cocking sub-part is provided with forward engaging means, e.g. a forward driver, for operatively engaging the release sub-part in the forward cocking direction of rotation of the cocking sub-part to rotate the release sub-part therewith during the cocking movement of the telescoping shaft, the release sub-part is provided with bolt receiving means arranged for operatively receiving the lock bolt means for releasably locking the release sub-part at the end of the cocking movement, the cocking sub-part is further provided with release effecting means, e.g. a displacement cam, for operatively releasing the lock bolt means from the release sub-part in the initial movement phase of the reverse releasing direction of rotation of the cocking sub-part, and the release sub-part is further provided with reverse engaging means, e.g. a reverse driver, for operatively engaging the cocking sub-part to rotate the cocking sub-part therewith during the remaining movement phase of the sub-parts in the reverse releasing direction of rotation.

In this regard, the sub-parts may be provided as cylindrical bodies having cooperating adjacent end faces containing the forward engaging means and reverse engaging means as coacting projections on such end faces, the bolt receiving means may include a locking edge, and the release effecting means may include a lifting or displacement cam. Preferably, one of the sub-parts may contain a cylindrical shoulder and the other of the sub-parts may contain a bore for receiving operatively the cylindrical shoulder for coaxial guiding of the sub-parts.

In accordance with a particular embodiment of the present invention, an interchangeable lens apparatus is provided for attachment to cameras, such as reflex cameras, comprising a lens assembly having a shutter portion arranged thereon for axial movement relative to the housing of the camera and adapted for accommodating a spring driven shutter sector drive, cocking means arranged in the shutter portion and adapted for cocking the spring driven shutter sector drive, a composite two part telescoping force transmission shaft operatively arranged for forward and reverse rotational movement as a cocking and release control means for the cocking means and including a cocking means associated first part and a camera drive associated second part, the first part being arranged for axial telescoping movement relative to the second part, and releasable lock bolt means operatively arranged for releasably locking the telescoping shaft.

In this regard, one telescoping shaft end comprises the end of the first part telescopingly remote from the second part and is drivably connected to the cocking means for cocking the spring driven shutter sector drive, and the opposite telescoping shaft end comprises the end of the second part telescopingly remote from the first part and is adapted, upon interchangeable attachment of the lens assembly to the camera, for positive operative driving rotational engagement with a cocking button controllable drive shaft disposed in the adjacent portion of the camera. The first part of the telescoping shaft comprises two mutually rotatable sub-parts including a lockable release sub-part and a cocking sub-part limitedly rotatable relative to each other and operatively arranged as coupling members for forward rotation in a shutter cocking direction and for reverse rotation in a shutter releasing direction.

Significantly, the cocking sub-part has forward engaging means for operatively engaging the release sub-part in the forward shutter cocking direction of rotation of the cocking sub-part to rotate the release sub-part therewith during the cocking movement of the telescoping shaft, and the release sub-part has bolt receiving means arranged for operatively receiving the lock bolt means for releasably locking the release sub-part at the end of such cocking movement. Also, the cocking sub-part further has release effecting means for operatively releasing the lock bolt means from the release sub-part in the initial movement phase of the reverse shutter releasing direction of rotation of the cocking sub-part, and the release sub-part further has reverse engaging means for operatively engaging the cocking sub-part to rotate the cocking sub-part therewith during the remaining movement phase of the sub-parts in the reverse shutter releasing direction of rotation.

As aforesaid, the sub-parts may be provided in the form of cylindrical bodies having cooperating adjacent end faces, the forward engaging means and reverse engaging means may be provided in the form of coacting projections on such end faces, the bolt receiving means may include a locking edge, and the release effecting means may include a lifting or displacement cam. In the same way, a cylindrical shoulder may be provided on one of the sub-parts and a bore in the other of the sub-parts for receiving the cylindrical shoulder for coaxial guiding of the sub-parts.

It will be appreciated that the foregoing specification and accompanying drawings are set forth by way of illustration and not limitation, and that various changes and modifications may be made therein without departing from the spirit and scope of the present invention which is to be limited solely by the scope of the appended claims.

What is claimed is:

1. Interchangeable lens apparatus for attachment to cameras, comprising a lens assembly having a movable portion arranged thereon for axial movement relative to the camera and adapted for accommodating a spring driven drive, cocking means arranged in the movable portion and adapted for cocking the spring driven drive, a composite telescoping force transmission shaft operatively arranged for forward and reverse rotational movement as a cocking and release control means for the cocking means and including a cocking means associated first part and a camera drive associated second part, the first part being arranged for axial telescoping movement relative to the second part, one telescoping shaft end comprising the end of the first part telescopingly remote from the second part and being drivably connected to the cocking means for cocking the spring driven drive, and the opposite telescoping shaft end comprising the end of the second part telescopingly remote from the first part and being adapted, upon attachment of the lens assembly to the camera, for positive operative rotational engagement with a drive shaft disposed in the adjacent portion of the camera, and releasable lock bolt means operatively arranged for releasably locking the telescoping shaft, the first part of the telescoping shaft comprising two mutually rotatable sub-parts including a lockable release sub-part and a cocking sub-part operatively arranged as coupling members for forward rotation in a cocking direction and for reverse rotation in a releasing direction, the cocking sub-part being arranged for operatively engaging the release sub-part in the forward cocking direction of rotation of the cocking sub-part to rotate the release sub-part therewith during the cocking movement of the telescoping shaft, and the lock bolt means being operatively arranged for releasably locking the release sub-part at the end of such cocking movement, and the cocking sub-part being further arranged for operatively releasing the lock bolt means from the release sub-part in the initial movement phase of the reverse releasing direction of rotation of the cocking sub-part, and the release sub-part being arranged for operatively engaging the cocking sub-part to rotate the cocking sub-part therewith during the remaining movement phase of the sub-parts in the reverse releasing direction of rotation.

2. Apparatus according to claim 1 wherein the cocking sub-part is provided with forward engaging means for operatively engaging the release sub-part in the forward cocking direction of rotation of the cocking sub-part to rotate the release sub-part therewith during the cocking movement of the telescoping shaft, the release sub-part is provided with bolt receiving means arranged for operatively receiving the lock bolt means for releasably locking the release sub-part at the end of the cocking movement, the cocking sub-part is further provided with release effecting means for operatively releasing the lock bolt means from the release sub-part in the initial movement phase of the reverse releasing direction of rotation of the cocking sub-part, and the release sub-part is further provided with reverse engaging means for operatively engaging the cocking sub-part to rotate the cocking sub-part therewith during the remaining movement phase of the sub-parts in the reverse releasing direction of rotation.

3. Apparatus according to claim 2 wherein the sub-parts are provided as cylindrical bodies having cooperating adjacent end faces containing the forward engaging means and reverse engaging means as coacting projections on such end faces, the bolt receiving means includes a locking edge, and the release effecting means includes a displacement cam.

4. Apparatus according to claim 3 wherein one of the sub-parts contains a cylindrical shoulder and the other of the sub-parts contains a base for receiving the cylindrical shoulder for coaxial guiding of the sub-parts.

5. Interchangeable lens apparatus for attachment to cameras, such as reflex cameras, comprising a lens assembly having a shutter portion arranged thereon for axial movement relative to the housing of the camera and adapted for accommodating a spring driven shutter sector drive, cocking means arranged in the shutter portion and adapted for cocking the spring driven shutter sector drive, a composite telescoping force transmission shaft operatively arranged for forward and reverse rotational movement as a cocking and release control means for the cocking means and including a cocking means associated first part and a camera drive associated second part, the first part being arranged for axial telescoping movement relative to the second part, one telescoping shaft end comprising the end of the first part telescopingly remote from the second part and being drivably connected to the cocking means for cocking the spring driven shutter sector drive, and the opposite telescoping shaft end comprising the end of the second part telescoping remote from the first part and being adapted, upon interchangeable attachment of the lens assembly to the camera, for positive operative rotational engagement with a cocking button controllable drive shaft disposed in the adjacent portion of the camera, and releasable lock bolt means operatively arranged for releasably locking the telescoping shaft, the first part of the telescoping shaft comprising two mutually rotatable sub-parts including a lockable release sub-part and a cocking sub-part limitedly rotatable relative to each other and operatively arranged as coupling members for forward rotation in a shutter cocking direction and for reverse rotation in a shutter releasing direction, the cocking sub-part having forward engaging means for operatively engaging the release sub-part in the forward shutter cocking direction of rotation of the cocking sub-part to rotate the release sub-part therewith during the cocking movement of the telescoping shaft, and the release sub-part having bolt receiving means arranged for operatively receiving the lock bolt means for releasably locking the release sub-part at the end of such cocking movement, and the cocking sub-part further having release effecting means for operatively releasing the lock bolt means from the release sub-part in the initial movement phase of the reverse shutter releasing direction of rotation of the cocking sub-part, and the release sub-part further having reverse engaging means for operatively engaging the cocking sub-part to rotate the cocking sub-part therewith during the remaining movement phase of the sub-parts in the reverse shutter releasing direction of rotation.

7. Apparatus according to claim 6 wherein the sub-parts are provided as cylindrical bodies having cooperating adjacent end faces, the forward engaging means and reverse engaging means are in the form of coacting projections on such end faces, the bolt receiving means includes a locking edge, and the release effecting means includes a displacement cam.

7. Apparatus according to claim 6 wherein a cylindrical shoulder is provided on one of the sub-parts and a bore is provided in the other of the sub-parts for receiving the cylindrical shoulder for coaxial guiding of the sub-parts.

* * * * *